US005311529A

United States Patent [19]
Hug

[11] Patent Number: 5,311,529
[45] Date of Patent: May 10, 1994

[54] LIQUID STABILIZED INTERNAL MIRROR LASERS

[75] Inventor: William F. Hug, Pasadena, Calif.

[73] Assignee: Omnichrome Corporation, Chino, Calif.

[21] Appl. No.: 84,084

[22] Filed: Jun. 28, 1993

Related U.S. Application Data

[63] Continuation of Ser. No. 795,974, Nov. 22, 1991, abandoned.

[51] Int. Cl.⁵ .............................................. H01S 3/04
[52] U.S. Cl. ........................................ 372/35; 372/55; 372/107
[58] Field of Search ................. 372/35, 109, 55, 56, 372/61, 107

[56] References Cited

U.S. PATENT DOCUMENTS

| | | | |
|---|---|---|---|
| 3,509,486 | 4/1970 | Patel | 372/35 |
| 3,931,589 | 1/1976 | Aisenberg et al. | 372/35 |
| 4,752,936 | 6/1988 | Gerhardt | 372/35 |
| 4,764,932 | 8/1988 | Peterson et al. | 372/35 |

FOREIGN PATENT DOCUMENTS 0098785 5/1987 Japan ...................... 372/35

*Primary Examiner*—James W. Davie
*Attorney, Agent, or Firm*—Spensley Horn Jubas & Lubitz

[57] ABSTRACT

A liquid stabilizing system stabilizes an internal mirror-/internal resonator gas discharge laser tube assembly which has a hermetically sealed gas laser tube which includes a gas, a capillary tube, an anode, an anode end assembly, a cathode, a cathode end bell, a cathode end assembly with electrical feed-throughs for the cathode, which are coaxially disposed with a central axis, and laser mirrors, which are sealably mounted to each end of the hermetically sealed gas laser tube. The liquid stabilizing system includes a cylindrical plastic jacket and a cooling liquid. The plastic jacket has a cooling liquid inlet and a cooling liquid outlet and surrounds the hermetically sealed gas laser tube. The cylindrical cooling jacket is sealed to the hermetically sealed laser tube by O-rings which are held in place by plastic retainers. An annulus is formed between the hermetically sealed laser tube and the plastic jacket. The cooling liquid fills the annulus so that the cooling liquid is in intimate contact with all or a large portion of the surface of the hermetically sealed gas laser tube, the thermal conductivity and the specific heat capacity of the cooling liquid being sufficient to prevent misalignment of the laser mirrors under conditions of liquid convection cooling by cooling a substantial portion of the hermetically sealed gas laser tube with minimal asymmetry relative to the central axis.

25 Claims, 3 Drawing Sheets

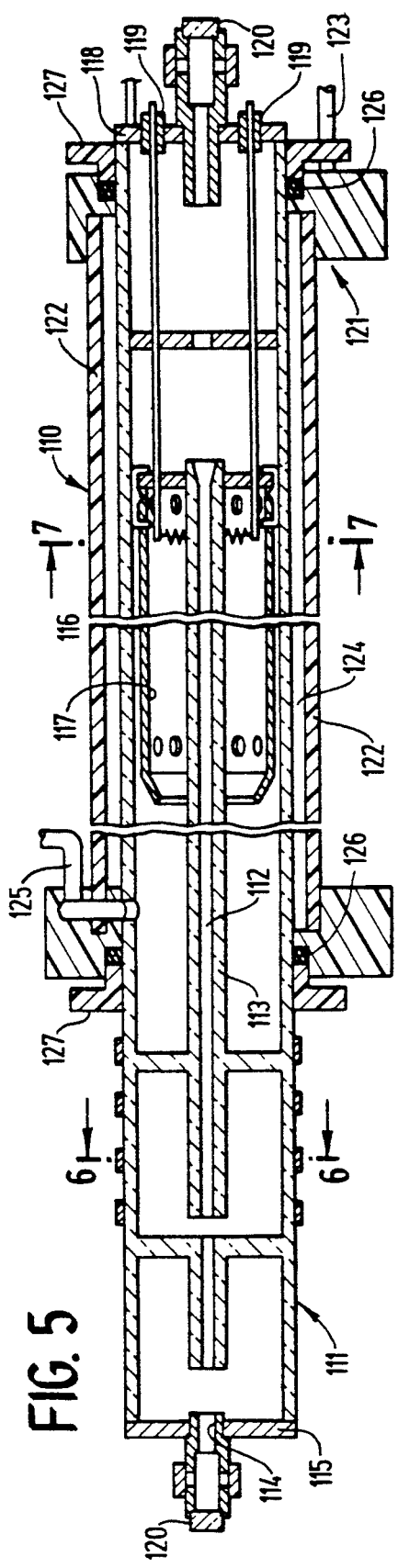
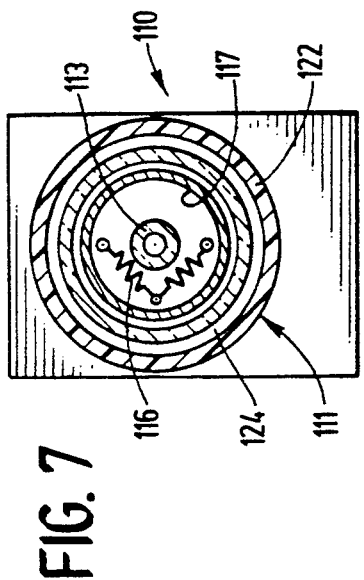
FIG. 4  FIG. 5  FIG. 6  FIG. 7

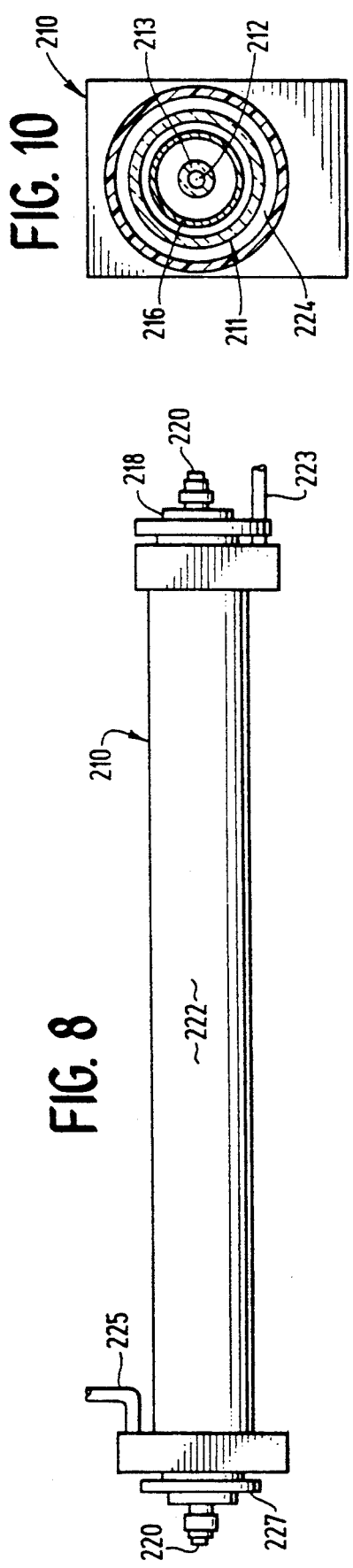
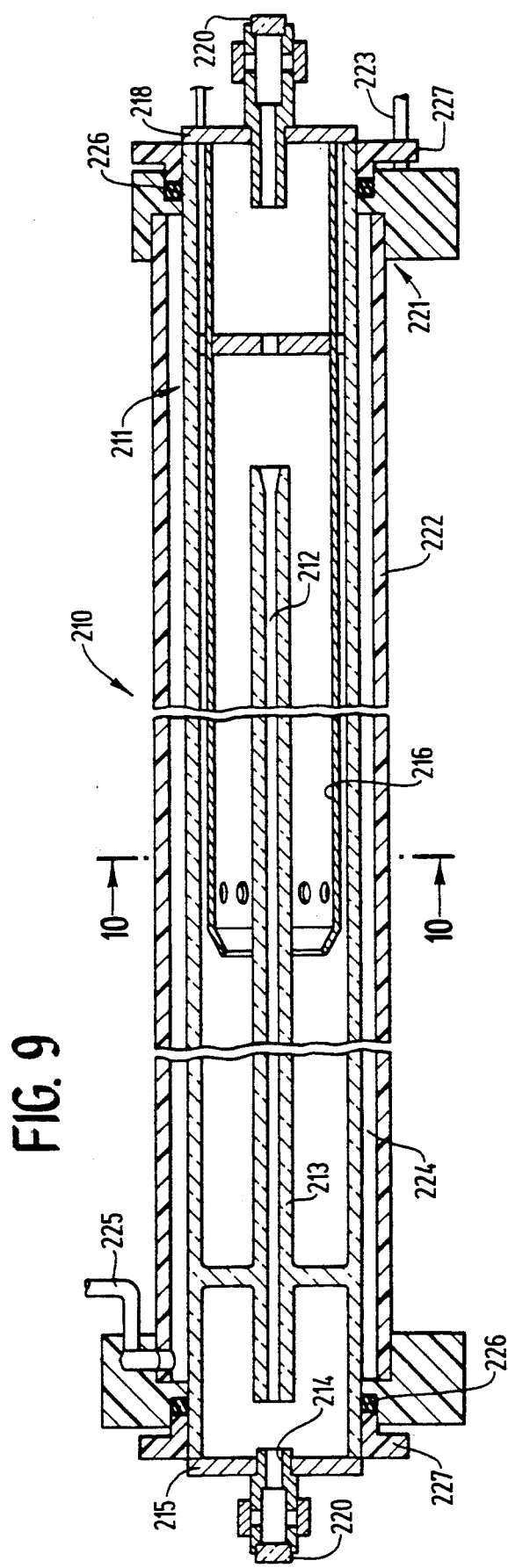

LIQUID STABILIZED INTERNAL MIRROR LASERS

This is a continuation of application Ser. No. 07/795,974 filed on Nov. 22, 1991, now abandoned.

BACKGROUND OF THE INVENTION

1. Field of the Invention

The field of the present invention is internal mirror/internal resonator gas laser tubes.

2. Description of the Prior Art

At present, all internal mirror/internal resonator configurations of gas lasers employ forced or free air convection for dissipation of waste heat from the laser tube. Internal mirror/internal resonator gas lasers employ an envelope forming a gas discharge tube as a resonator support structure where laser mirrors are sealably mounted directly to the ends of the structure and maintained in alignment by the laser tube structure. The internal mirror/internal resonator arrangement has several advantages including simplicity in construction, ruggedness and dependability in operation and ease of maintenance. Historically, however, they have suffered from problems with resonator alignment as a result of thermal distortion of the plasma tube envelope due to operation at elevated temperatures relative to ambient conditions. This is especially true for higher power and/or longer versions of each of these laser types.

Continuous discharge gas lasers in which the gas is from the group consisting of argon, krypton, a mixture of argon and krypton, neon, and helium-cadmium, and helium-neon, are relatively energy inefficient in operation, resulting in the generation of significant waste heat which must be dissipated from the body of the laser tube. Argon, neon, krypton, a mixture of argon and krypton lasers operating in a continuous mode may generate waste heat on the order of fifty to two hundred watts per centimeter of bore length along the positive column or main bore of the laser discharge tube. Helium-cadmium lasers generate waste heat on the order of 4 watts per centimeter and helium-neon lasers about 0.4 watts per centimeter.

In general there are three types of laser tube and resonator configurations for these types of high heat generating gas and metal vapor discharge lasers: internal mirror/internal resonator; internal mirror/external resonator; and external mirror/external resonator types. In internal mirror/internal resonator laser tubes the laser mirrors are sealed onto the ends of the laser tube and therefore are internal to the laser tube. The resonator structure which maintains the laser mirrors in alignment with respect to each other and with respect to the gas discharge capillary of the laser tube is the laser tube structure itself. Therefore the term used to describe this type of resonator construction is internal resonator. In internal mirror/external resonator laser tubes the mirrors are mounted directly to the ends of the laser tube structure and form a hermetic seal. The alignment of these mirrors is however supported and maintained in alignment by an external resonator structure usually made of low thermal expansion materials such as Invar or quartz. Because of the usual difference in thermal expansion coefficient between the laser tube structural materials and the resonator materials the mirrors are normally mechanically isolated from the laser tube using a hermetically sealed bellows which is located between the mirror seals and the main portion of the laser tube. This bellows takes up the differential expansion between the laser tube and the external resonator which occurs due to heating of the laser tube. In external mirror/external resonator laser tube configurations the laser tube is sealed at the ends using windows which are disposed at the Brewster angle. The laser mirrors are external to the laser tube and not part of the hermetic envelope of the laser tube. The laser mirrors are supported in the external resonator in order to maintain alignment.

The choice of laser tube/resonator configuration depends upon the type of laser, its heat dissipation and the performance requirements including output power and optical stability characteristics. Each of the basic types of lasers described above has been available in all three types of tube/resonator configurations depending on the size of the laser. Small lasers for low output power applications normally use the internal mirror/internal resonator type of construction. This type of construction is typical of helium-neon, helium-cadmium, and low power argon-ion lasers. Higher power lasers and/or lasers with better beam pointing or transverse mode stability requirements utilize external resonators whether with internal or external mirrors. External resonators are needed to thermally and mechanically decouple the laser mirrors from the waste heat generated within the laser tube. Because an internal mirror/internal resonator laser tube is operating at elevated temperature compared to ambient, any slight variation in coolant distribution or temperature will cause lateral or axial temperature gradients along the surface of the laser tube. The most problematical temperature gradient in most internal mirror/internal resonator lasers is the lateral temperature gradient, dT, since it directly causes laser mirror rotational misalignments. Steady state temperature gradients which are independent of ambient temperature, input power level, or laser tube operating orientation can normally be compensated for by initial alignment of a laser. These gradients are considered controlled. Random temperature gradients are those which vary with ambient temperature, input power level, laser tube operating orientation or other random parameters. In general this random portion of the temperature gradient is proportional to the laser tube wall temperature. As the tube wall temperature decreases, so does dT. In the limiting case where there is no differential temperature between the tube envelope and ambient, there can be no steady state or transient lateral temperature gradients generated as a result of the cooling. Since thermal misalignment of laser mirrors is due to the magnitude of dT and independent of tube wall temperature, the lowest thermal misalignment will occur at the lowest tube wall temperature above ambient. The random gradients cause constant changes in the differential elongation of the one side of the tube with respect to the other side thereby causing angular rotation of the laser mirrors with respect to each other and with respect to the centerline of the gain capillary. This effect produces wander of the laser beam axis and, in severe cases, variations in the laser output power and mode shape. When a laser tube is subjected to a random lateral temperature gradient, dT, averaged across the length of the laser tube, one side of the laser tube grows a random amount which causes an approximately equal and opposite angular misalignment of the each laser mirror by an amount $O_D = aLdT/2D$ where $a$ is the thermal expansion coefficient of the tube envelope material, L is the spacing between laser mirrors, dT is the random lateral temperature gradient, and D is the laser tube diameter. More elaborate formulations can be generated to describe complex structures where the random gradient varies along the length of the tube and/or the thermal expansion coefficient and/or diameter varies along the length of the tube as a result of the use of several different construction materials and geometry.

U.S. Pat. No. 4,625,317, issued on Nov. 25, 1986 to William P. Kolb and Dale E. Crane, entitled Internal Mirror Laser, teaches a thermal structure and cooling system for an argon-ion laser that is virtually free of thermal asymmetries which includes a laser cathode having a housing constructed of a material of high thermal conductivity and relatively low thermal expansion in conjunction with a cooling structure configuration which readily and uniformly dissipates heat. The support structure is fabricated of copper material of at least a minimal thickness and the cooling fins are disposed in one and two stages of radial fins at specified regions along the support structure forming the discharge tube and enclosed by a tubular thermally conductive band. The use of laser tube construction materials which have a high figure of merit equal to the ratio of thermal conductivity divided by thermal expansion coefficient for the cathode end bell as well as end caps of the laser tube. The high thermal conductivity of the cathode end bell allows circumferential conduction within the end bell and alleviation of random lateral temperature gradients within the cathode end bell.

None of the prior art patents or publications teaches the use of high thermal conductivity, high specific heat capacity liquids in contact with the external surface of the laser tube for the purpose of reducing random lateral and longitudinal temperature gradients in order to stabilize the resonator of an internal mirror/internal resonator laser tube thereby increasing the beam pointing, output power and transverse mode stability and the output power capability of internal mirror/internal resonator laser tubes.

U.S. Pat. No. 5,048,032, entitled Air Cooled RF Induction Excited Ion Laser, issued to John Ekstrand, John P. Goldsborough and David L. Wright on Sep. 10, 1991, teaches an ion laser which includes a resonant cavity and a heat dissipating mechanism. The resonant cavity includes an output coupler and a laser bore and contains an active medium. The heat dissipating mechanism dissipates heat which is associated with the laser bore during excitation of the active medium.

U.S. Pat. No. 5,048,043, entitled Gas Laser, issued to Wolfgang Welsch, Hans Krueger, Klemens Huebner and Rudolf Haeusler on Sep. 10, 1991, teaches a gas laser tube structure. U.S. Pat. No. 5,052,014, entitled Gas Laser Tube with Mask, issued to Masaaki Hiroshima and Yoshio Nakazawa on Sep. 24, 1991, also teaches a gas laser tube structure. U.S. Pat. No. 5,050,184, entitled Method and Apparatus for Stabilizing Laser Mirror Alignment, issued to George A. Nelson on Sep. 17, 1991, teaches an apparatus for stabilizing laser mirror alignment.

U.S. Pat. No. 4,953,176, entitled Angular Optical Cavity Alignment Adjustment Utilizing Variable Distribution Cooling, issued to John P. Ekstrand on Aug. 28, 1990, teaches varying the distribution of heat flow out of the plasma tube or structural element to compensate for any misalignment in response to position of the laser beam which controls misalignment of a laser beam due to bending of a plasma tube for an internal resonator ion laser, or another structural element supporting beam guiding optics. A detector is mounted along the optical path of the laser beam, and generates a position signal indicating drift of the laser beam from a preferred position. A cooling system, thermally connected to the structural material of the plasma tube or the structural element and connected to the detector, conducts heat out of the structural material in a controlled distribution in response to the position signal, so that misalignment of the optics due to thermal bending is minimized.

U.S. Pat. No. 4,987,574 issued on Jan. 22, 1991 to William R. Rowley and Patrick Gill, entitled Helium-Neon Lasers, teaches a stabilized helium-neon laser emits radiation in the ranges of ultra-violet, infra-red and visible other than red in at least two modes. A stabilizing system consists of an alignment heater which bends the laser tubes toward optimum alignment, a coil heater which cyclically varies the tube length and permanent magnets which reduce instability of mode polarizations and to optimize relative intensities of the modes. The transmitted output is stabilized in frequency by control of the laser tube length, with the stabilization signal derived from the steady or varying intensity of intensities of one or both of two orthogonally polarized optical outputs.

Another problem that occurs with lasers operating at high temperatures is that the tube bends and becomes misaligned. U.S. Pat. No. 4,010,363, entitled Laser Alignment System, issued to Karl Gerhard Herngvist on Mar. 1, 1977, teaches a laser alignment system which includes a gas discharge tube for producing the laser beam and a plurality of heaters each of which extends longitudinally along the exterior of the gas discharge tube spaced around the longitudinal axis of the gas discharge tube and which selectively heat the gas discharge tube. The laser alignment system is a rather complicated system which requires the comparison of each of the along the gas discharge tube. Using control circuits selective portions of the gas discharge tube may be heated when the laser becomes misaligned. The system is complex and requires positional misalignment data collection and feedback signals.

Referring again to internal mirror/internal resonator laser tubes, as the length of a laser tube design is increased, the tolerance to angular misalignment of the laser mirrors decreases. However, with increasing tube length, the angular misalignment of the laser mirrors increases due to random lateral temperature gradients induced in the tube by localized variations in the coolant temperature distribution, flow velocity and its distribution, and other factors. At some laser tube length the random deformation becomes greater than the tolerance to deformation and the beam pointing, output power and transverse mode stability degrades to an unacceptable level. Depending on the type of laser and the heat generation required to provide optical output, these lasers have been more or less limited in length and, as a result, laser output power. In addition, the more stringent the requirement on beam pointing, output power or transverse mode stability, the more limited the laser tube length and output power.

The precise length where a tube/resonator design must transition from internal to external resonator depends on many design factors such as the thermal conductivity, thermal expansion coefficient, geometry of the laser tube envelope, and laser mirror configuration, as well as performance factors such as beam pointing, output power and transverse mode stability. Three design parameters can be used to describe the design requirements for a stable internal mirror/internal resonator laser tube: the tolerance angle, $\theta_T$; the random thermal deformation angle, $\theta_D$ and the critical tube length, $L_C$, which is defined as that length where the tolerance angle, $\theta_T$ is equal to the random thermal deformation angle, $\theta_D$.

U.S. Pat. No. 4,233,568, entitled Laser Tube Mirror Assembly, issued to Randolph W. Hamerdinger and Robert C. McQuilan on Nov. 11, 1980, teaches a laser tube assembly which includes a laser tube and pair of laser mirrors. The laser tube has a hard glass to metal sealed laser resonator which is internal to the plasma tube for use in a helium-cadmium laser. Each laser mirror is sealed to one end of the laser tube. The sealant is able to withstand the relatively high temperatures which are utilized to remove contaminants during fabrication thereof. The sealant is also able to minimize gas permeation therethrough during utilization of the laser tube. U.S. Pat. No. 3,904,986, entitled Gas Laser Tube, issued to Karl Gerhard Hernqvist on Sep. 9, 1975, teaches a gas laser tube which includes an elongated envelope, an active laser medium, an output coupling mirror assembly which is disposed on one end of the elongated envelope and a reflector mirror assembly which is disposed on the other end thereof. U.S. Pat. No. 4,149,779, entitled Internal Laser Mirror Alignment Fixture, issued to Randolph W. Hamerdinger on Apr. 17, 1979, teaches a laser tube mirror alignment fixture.

U.S. Pat. No. 4,224,579, entitled Metal Vapor Laser Discharge Tube, issued to Calvin J. Marlett, Edwin A. Reed, Richard C. Johnson and William F. Hug on Sep. 23, 1980, teaches a metal vapor laser which includes an envelope, a capillary tube, an anode, a cathode and a pair of mirrors. The metal vapor laser discharge tube also includes a reservoir of helium, an evaporator and a condenser. The evaporator is fluidly coupled to the capillary tube adjacent to the anode. An active material is placed in the evaporator. The condenser is fluidly coupled to the capillary tube adjacent to the cathode. The laser discharge tube further includes a heater. The heater is mechanically coupled to the evaporator. The heater applies heat to the active material in the evaporator in order to produce a vapor the positive ions of which the cathode draws to the condenser.

Prior art patents have suggested various techniques to improve heat dissipation efficiency in external mirror/external resonator laser. However, none of these prior art patents relate to the method disclosed here of using liquids to stabilize the performance of internal mirror/internal resonator gas discharge laser tubes.

U.S. Pat. No. 4,715,039, entitled Internal Resonator Water Cooled Ion Laser, issued to Mike F. Miller and Kim M. Gunther on Dec. 22, 1987, teaches a laser which includes a resonator tube, a magnet and a plasma tube. The magnet is concentrically mounted in a spaced relationship within the resonator tube defining between the magnet and the resonator an outer coolant channel. The plasma tube is concentrically mounted in a spaced relationship within the magnet defining between the magnet and the resonator an inner coolant channel. The mirrors are then mounted externally to the plasma tube and are supported by an external resonator structure.

U.S. Pat. No. 4,897,851 issued on Jan. 30, 1990 to David L. Vecht and Shinan-Chur S. Sheng, entitled Water Cooled Laser Housing and Assembly, teaches an external mirror/external resonator which includes a concentrically arranged plasma tube, magnet and resonator tube. The mirrors and associated optics are housed at opposing ends of the resonator tube and are mounted on rods extending from respective ends of the resonator tube. The use of laser tube geometry and tube construction materials stabilizes the beam pointing direction of an external mirror/external resonator argon-ion laser.

U.S. Pat. No. 3,763,442, entitled Ion Laser Plasma Tube Cooling Device and Method, issued to William H. McMahan on Oct. 2, 1973, teaches a device which cools an ion laser plasma tube which is based on the utilization of a thermal conductor which is adapted to become fused to an ion laser plasma tube in such a manner as to efficiently transfer the heat which is generated to a surrounding cooling medium, such as air, while mechanically adjusting to differential thermal expansion and contraction of the ion laser plasma tube.

U.S. Pat. No. 4,081,762, entitled Gas Laser with a Laser Capillary Positioned in a Discharge Tube, issued to Hans Golser and Helmut Kindl on Mar. 28, 1978, teaches an improvement to a gas laser the components of which have substantially equal coefficients of thermal expansion. The gas laser includes a vacuum-tight discharge tube, a laser capillary, an anode, a cathode, electrical discharge generator and two mirrors which form an optical resonator.

U.S. Pat. No. 4,953,172, entitled Gas Laser, issued to Thomas R. Gurski on Aug. 28, 1990, teaches a gas laser with a discharge bore which is defined by a single-bore extruded ceramic discharge tube is disclosed. An outer tube is located over the discharge tube so as to define an annular space therebetween. Caps are located over both ends of the tubes and each cap is provide with at least one gas transport passage so the discharge bore and the annular space are in communication. The annular space is filled with electrically insulating, thermally conducting components such as washers, baffles and ceramic granules. When the laser is in operation the annular space serves as a gas return path so a uniform equilibrium pressure is maintained in the discharge bore. The components in the annular space inhibit the flow of electrical current in the space so all of the current flow is through the discharge bore so as to excite the gas therein. The components in the annular space also provide a thermally conductive path between the discharge tube and the outer tube to diffuse heat away from the discharge bore.

U.S. Pat. No. 4,477,907, entitled Low Power Argon-ion Gas Laser, issued to William H. McMahan on Oct. 16, 1990, teaches a gas laser which achieves low output power by using a plasma guide and mirror configuration which restricts lasing action to a portion of the resonator cavity at relatively high conversion efficiency.

U.S. Pat. No. 4,481,633, entitled Wet-jacket Argon-ion Laser, issued to William H. McMahan on Nov. 6, 1984, teaches a segmented ceramic tube which forms an external mirror/external resonator argon-ion laser discharge tube. The segmented ceramic tube is fluid cooled and constructed to avoid shunting of current through the coolant.

In operation, a laser of the external mirror/external resonator, such as an argon laser, generates considerable heat, which must be removed, at least in applications where stability of laser output is critical. The heat can cause thermal expansion of the resonator structure and can adversely affect the mirror alignment and thus the laser output. Water cooling of the laser is frequently utilized to minimize this problem.

SUMMARY OF INVENTION

The present invention is directed to a liquid stabilizing system which is for use with a hermetically sealed internal mirror/internal resonator gas discharge laser tube and which uses a liquid-filled plastic jacket to provide superior optical and structural stability characteristics over a wider range of input and output power levels. Through such a system substantial reductions can be achieved in random lateral and longitudinal temperature gradients which allow creation of longer, higher power argon, krypton, a mixture of argon and krypton, neon, helium-cadmium and helium-neon lasers. Such laser heads may be two to ten times smaller in volume than comparable air cooled laser heads for argon, krypton, a mixture of gases, helium-cadmium or helium-neon lasers.

In another aspect of the present invention, a liquid stabilizing system is used with a hermetically sealed internal mirror/internal resonator gas discharge laser tube which uses a closed loop coolant liquid bath to stabilize the resonator and dissipate waste heat at a remote location by using a compact heat exchanger.

In a further aspect of the present invention, a liquid stabilizing system for use with a hermetically sealed internal mirror/internal resonator gas discharge laser tube may use cooling liquids which have high thermal conductivity and high specific heat capacity to provide higher film heat transfer coefficients and allow extraction of heat from the hermetically sealed internal mirror/internal resonator gas discharge laser tube at much lower tube envelope temperatures. A typical cooling liquid, such as either ethylene glycol or water, has a film heat transfer coefficients which is ten to fifty times greater than those for air so that by using liquids rather than air, waste heat can be extracted from the hermetically internal mirror/internal resonator gas discharge laser tube at tube temperatures which are ten to fifty times closer to ambient temperature with this lower temperature difference reducing random lateral temperature gradients and substantially stabilizing the hermetically sealed internal mirror/internal resonator gas discharge laser tube thermal structure thereby allowing the design of internal mirror/internal resonator laser tube assemblies with greater output power, beam pointing, and transverse mode stability and higher output power capability while maintaining the desirable features of an internal mirror/internal resonator laser tube assembly.

In yet another aspect of the present invention, a liquid stabilizing system for use with a hermetically sealed internal mirror/internal resonator gas discharge laser tube may use a cooling liquid which has a high thermal conductivity and a high specific heat capacity to assist in alleviating lateral temperature gradients thereby providing circumferential thermal conductance around the hermetically seal internal mirror/internal resonator gas discharge laser tube without introducing the problems of using high thermal expansion solid materials within the hermetically sealed internal mirror/internal resonator gas discharge laser tube of U.S. Pat. No. 4,625,317. This is aided by axis-symmetric helical convection of the liquid flow around the hermetically sealed internal mirror/internal resonator gas discharge laser tube.

It is still another aspect of the present invention, a liquid stabilizing system for use with a hermetically sealed internal mirror/internal resonator gas discharge laser tube may use a cooling liquid which has a high thermal conductivity and a high specific heat capacity to allow the efficient and remotely located rejection of waste heat from the laser head using a liquid-to-air or liquid-to-liquid heat exchanger. The liquid stabilizing system enables a laser head to be operated with no thermal or convection disturbance in the vicinity of the laser head as that which normally occurs with an air cooled laser head. For applications to clean rooms or in sensitive holographic or interferometric applications either a high temperature laser head or cooling hoses and air convection in the vicinity of the laser head cannot be tolerated. For an air cooled laser head the air needs to be ducted into and out of the laser head using large hoses which are typically more than seven centimeters in diameter and which operate at high temperatures. In many sensitive applications both the laser head and the air cooling hoses need to be insulated to avoid heat rejection from the coolant hoses and/or the laser head. This is avoided with the liquid system disclosed here where all heat rejection is performed at low temperatures and with compact low temperature coolant hoses which are typically less than one centimeter in diameter.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE DRAWING

FIG. 4 is a longitudinal view of a liquid stabilized internal mirror/internal resonator helium-cadmium discharge laser tube assembly.

FIG. 5 is a longitudinal view in cross-section of the liquid stabilized internal mirror/internal resonator helium-cadmium discharge laser tube of FIG. 4.

FIG. 6 is a first transverse view in cross-section of the liquid stabilized internal mirror/internal resonator helium-cadmium discharge laser tube of FIG. 4 taken along the line 6—6 of FIG. 5.

FIG. 7 is a second transverse view in cross-section of the liquid stabilized internal mirror/internal resonator helium-cadmium discharge laser tube of FIG. 4 taken along the line 7—7 of FIG. 5.

FIG. 8 is a longitudinal view of a liquid stabilized internal mirror/internal resonator helium-neon discharge laser tube assembly.

FIG. 9 is a longitudinal view in cross-section of the liquid stabilized internal mirror/internal resonator helium-neon discharge laser tube of FIG. 8.

FIG. 10 is a transverse view in cross-section of the liquid stabilized internal mirror/internal resonator helium-neon discharge laser tube of FIG. 8 taken along the line 10—10 of FIG. 9.

DESCRIPTION OF THE PREFERRED EMBODIMENTS

Figure 3:
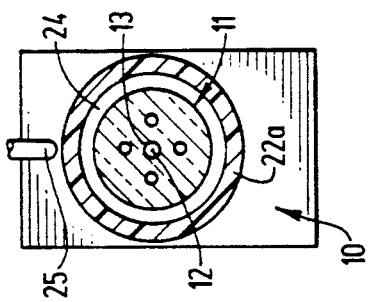
FIG. 3 is a transverse view in cross-section of the liquid stabilized internal mirror/internal resonator argon discharge laser tube of FIG. 1 taken along line 3—3 of FIG. 2.
Figure 1:
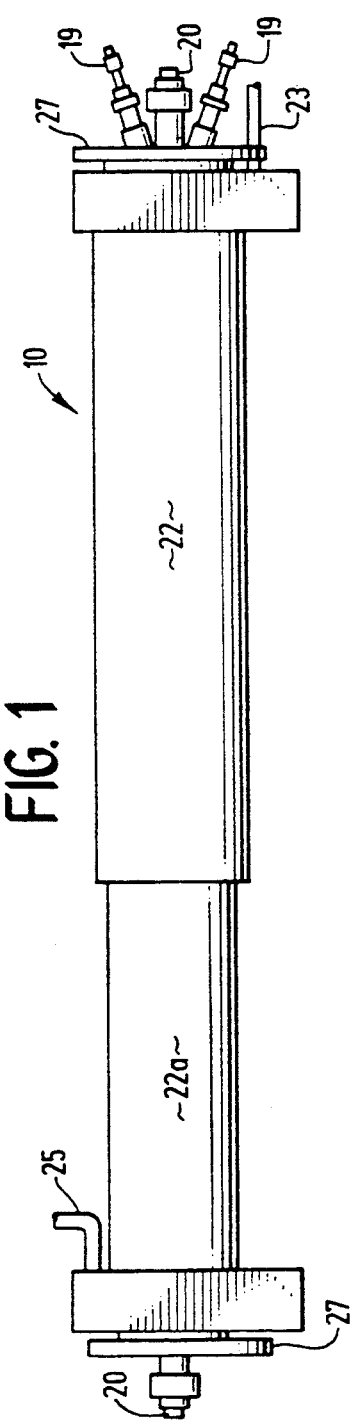
FIG. 1 is a longitudinal view of a liquid stabilized internal mirror/internal resonator argon discharge laser tube assembly.
Figure 2:
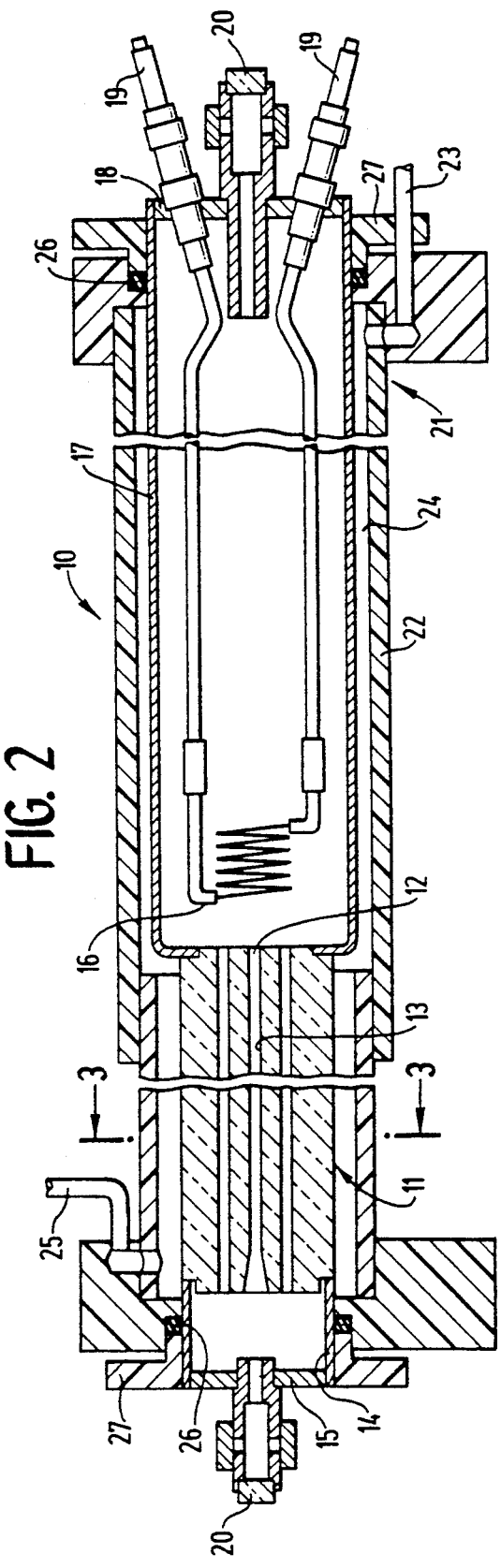
FIG. 2 is a longitudinal view in cross-section of the liquid stabilized hermetically sealed internal mirror/internal resonator argon laser tube of FIG. 1.

Referring to FIG. 1 in conjunction with FIG. 2 and FIG. 3 a liquid stabilized internal mirror/internal resonator gas discharge laser tube assembly 10 includes a hermetically sealed gas laser tube 11 including a gas 12, a capillary tube 13, an anode 14, an anode end assembly 15, a cathode 16, a cathode end bell 17, a cathode end assembly 18 with electrical feed-throughs 19 for the cathode 16, laser mirrors 20 and a liquid stabilizing system 21 which are coaxially disposed with a central axis. The gas 12 includes at least one gas of a group consisting of argon gas, krypton gas, neon gas, a mixture including argon gas, krypton gas and neon gas. The laser mirrors 20 are in alignment about the central axis. The hermetically sealed gas laser tube 11 including the laser mirrors 20, the capillary tube 13, the anode 14, the anode end assembly 15, the cathode 16, the cathode end bell 17, the cathode end assembly 18 and the electrical feed-throughs 19 are made of traditional construction materials. The liquid stabilizing system 21 includes a cylindrical plastic jacket 22 surrounding the hermetically sealed gas laser tube 11, a cooling liquid inlet 23, a cooling liquid 24 and a cooling liquid outlet 25. The plastic jacket 22 is sealed to the hermetically sealed laser tube 11 by O-rings 26 which are held in place by plastic retainers 27. The annulus between the hermetically sealed laser tube 11 and the plastic jacket 22 is filled with the cooling liquid 24. The cooling liquid 24 may be either ethylene glycol or water with a thermal conductivity greater than $1.0 \times 10^{-3}$ watts/centimeter/° C. and/or a specific heat capacity greater than 0.50 joule/gram/° C. The plastic jacket 22 puts the cooling liquid 24 in intimate contact with all or a large portion of the surface of the liquid stabilized internal mirror/internal resonator gas discharge laser tube 11. The thermal conductivity and the specific heat capacity of the cooling liquid 24 is sufficient to prevent misalignment of the laser mirrors 20 under conditions of liquid convection cooling. The cooling liquid 24 enters the liquid stabilizing system 21 through cooling liquid inlet 23 and cools by liquid convection cooling a substantial portion of the hermetically sealed gas laser tube 11 with minimal asymmetry relative to the central axis.

In a simplified liquid stabilized internal mirror/internal resonator laser tube assembly 10 the laser mirrors 20 are hermetically sealed to the ends of the hermetically sealed gas laser tube 11 of length, L, and constant diameter, D, centered on the optical axis of the capillary tube 13. The laser mirrors 20 form the optically resonant cavity of the liquid stabilized internal mirror/internal resonator gas discharge laser tube assembly 10 and are held in alignment with respect to each other and with respect to the optical gain medium within the capillary tube 13. Within the capillary tube 13 is a limiting optical aperture of diameter, d, normally located near the spherically concave output laser mirror 20 located at the anode end of the capillary tube 13. Commonly in internal mirror/internal resonator gas discharge laser tubes, the main discharge capillary bore serves as the optical limiting aperture. The capillary tube may be formed out of Beryllia and the anode and the cathode end bell may be formed out of Kovar which has a coefficient of expansion of $65 \times 10^{-7}$ per degree Centigrade and a diameter, D, of 4 centimeters. The random lateral temperature gradient, dT, is proportional to the temperature of the liquid stabilized internal mirror/internal resonator gas discharge laser tube assembly 10 and is controlled by heat transport capability of the cooling fluid. Since heat dissipation from the hermetically sealed gas laser tube 11 is proportional to the product of film heat transfer coefficient and temperature difference between the fluid used to cool the hermetically sealed gas laser tube 11 and the laser tube wall temperature, as the film heat transfer coefficient is increased the temperature of the hermetically sealed gas laser tube 11 is decreased proportionally. The film heat transfer coefficient is typically ten to fifty times greater for flowing liquids than for flowing cooling air. Therefore the body temperature of the hermetically sealed internal mirror/internal resonator gas laser tube 11 will be decreased ten to fifty times using liquid cooling compared to air cooling. The random lateral temperature gradients will also be reduced proportionally. Cooling liquids additionally have high specific heat capacity which can carry off the waste heat from the hermetically sealed gas laser tube 11 with a low temperature rise compared to ambient air. This is desirable since axial temperature gradients are also important to be avoided. Below is a table of thermal properties of typical laser tube construction and coolant fluid materials.

TABLE I

THERMAL PROPERTIES FOR CAPILLARY TUBE AND COOLANT MATERIALS

| MATERIAL | Thermal Conductivity W/cm/°C. | Specific Heat Capacity J/gm/°C. | Thermal Expansion Coefficient × $10^{-7}$/°C. | Film Heat Transfer Coefficient watts/cm²/°C. |
|---|---|---|---|---|
| Beryllia (BeO) | 1.968 | | 65 | — |
| Kovar (NiFeCo Alloy) | 0.165 | | 59 | — |
| 4750 (NiFe Alloy) | 0.157 | | 75 | — |
| Invar | 0.102 | | 9 | — |
| 7740 Glass (Pyrex) | 0.013 | | 32 | — |
| 7052 Glass | 0.012 | | 47 | — |
| Water (H2O) | 0.006 | 4.18 | fluid | 0.250–2.50 |
| Ammonia (liquid) | 0.0052 | 4.82 | fluid | |
| Glycerin | 0.0029 | 2.40 | fluid | |
| Ethylene Glycol | 0.0025 | 2.395 | fluid | 0.125–1.25 |
| Engine oil | 0.00145 | 1.89 | fluid | |
| Air | 0.00034 | 0.313 | fluid | 0.005–0.125 |

The hermetically sealed internal mirror/internal resonator gas laser tube 11 is stable when the random thermal deformation angle, $\theta_D$, is less than the tolerance angle, $\theta_T$. The random thermal deformation angle, $\theta_D$, equals $aLdT/2D$ where a is the thermal expansion coefficient of the hermetically sealed gas laser tube 11 from laser mirror 20 to laser mirror 20, dT is the random lateral temperature gradient, and D is the diameter of the hermetically sealed internal mirror/internal resonator gas laser tube 11. Typical values are: a equals $65 \times 10^{-7}$, L equals 30 centimeters, D equals 4 centimeters and dT equals 0.5° C. for a hermetically sealed internal mirror/internal resonator gas laser tube 11. The random thermal deformation angle, $\theta_D$, describes the amount of angular deformation of the laser mirrors 20 which occur when a laser is operated with liquid cooling.

The tolerance angle, $\theta_T$, of a laser assembly describes the ability of a laser tube design to withstand angular misalignment of the laser mirrors 20 before the laser power, beam position or beam shape, or transverse mode characteristics are degraded to an unacceptable level. In a typical hermetically sealed internal mirror-/internal resonator gas laser tube 11 the laser mirrors 20 form a resonant cavity by using one spherically concave transmitting laser mirror and one flat reflecting mirror. The radius of curvature of the concave mirror, R, is typically slightly longer than the spacing between the laser mirrors 20, L, in order to increase the angular tolerance as much as possible. Longer radius mirrors can be used and may improve the output performance for a given tube length, however the tolerance angle, $\theta_T$, will be degraded. The mirror radius cannot be smaller than L for well known reasons. The displacement of the laser beam within the capillary tube 13 due to thermal distortion of the capillary tube 13 causes the laser beam to be displaced by kd against a limiting aperture whose diameter is d. Only a small amount of motion can be tolerated as a percentage of the limiting aperture size before the output power and mode purity begin to change significantly. The tolerance to angular motion of the laser mirrors 20 is given by $\theta_T = kd/2R = kd/2.2L$ where $kd = 0.005$ centimeter which is typically about 5% of a limiting aperture diameter within the capillary tube 13 and $R = 1.1L$ in this example. The dependence of tolerance angle, $\theta_T$, on the length of the capillary tube 13 can be influenced to a certain extent by design. However the values shown in this description provide nearly the widest tolerance that can be achieved. The ratio of tolerance angle, $\theta_T$, to random thermal deformation angle, $\theta_D$, is defined here as the thermal stability factor (STF). Laser designs with STF values above one are stable while designs with STF below one are unstable. The greater above or below one, the greater the stability or instability of the design. The laser tube length for which STF equals one is defined as the critical length, $L_C$. Use of the cooling liquid 24 substantially improves the stability of a laser design of any length and also allows stable designs of increased tube length which would not be possible with air as the cooling fluid. The operation of continuous-wave argon, krypton, argon/krypton, helium-cadmium, and helium-neon lasers is well known and need not be described herein other than to emphasize that all of these lasers generate a substantial amount of waste heat which must be dissipated.

Referring to FIG. 4 in conjunction with FIG. 5, FIG. 6 and FIG. 7 a liquid stabilized internal mirror/internal resonator helium-cadmium discharge laser tube assembly 110 includes a hermetically sealed gas laser tube 111 including a gas 112, a capillary tube 113, an anode 114, an anode end assembly 115, a cathode 116, a cathode end assembly 118 with electrical feed-throughs 119 for the cathode 116, laser mirrors 120 and a liquid stabilizing system 121 which are coaxially disposed with a central axis. The gas 112 is a mixture of helium and cadmium vapor. The laser mirrors 20 are in alignment about the central axis. The hermetically sealed gas laser tube 111 including the laser mirrors 120, the capillary tube 113, the anode 114, the anode end assembly 115, the cathode 116, the cathode end assembly 118 and the electrical feed-throughs 119 are made of traditional construction materials. The liquid stabilizing system 121 includes a cylindrical plastic jacket 122 surrounding the hermetically sealed gas laser tube 111, a cooling liquid inlet 123, a cooling liquid 124 and a cooling liquid outlet 125. The plastic jacket 122 is sealed to the hermetically sealed laser tube 111 by O-rings 126 which are held in place by plastic retainers 127. The annulus between the hermetically sealed laser tube 111 and the plastic jacket 122 is filled with the cooling liquid 124. The cooling liquid 124 may be either ethylene glycol or water with a thermal conductivity greater than $1.0 \times 10^{-3}$ watts/centimeter/° C. and/or a specific heat capacity greater than 0.50 joule/gram/° C. The plastic jacket 122 puts the cooling liquid 124 in intimate contact with all or a large portion of the surface of the liquid stabilized internal mirror/internal resonator gas discharge laser tube 111. The thermal conductivity and the specific heat capacity of the cooling liquid 124 is sufficient to prevent misalignment of the laser mirrors 120 under conditions of liquid convection cooling. The cooling liquid 124 enters the liquid stabilizing system 121 through the cooling liquid inlet 123 and cools by liquid convection cooling a substantial portion of the hermetically sealed gas laser tube 111 with minimal asymmetry relative to the central axis.

Referring to FIG. 8 in conjunction with FIG. 9, FIG. 10 a liquid stabilized internal mirror/internal resonator helium-neon discharge laser tube assembly 210 includes a hermetically sealed gas laser tube 211 including a gas 212, a capillary tube 213, an anode 214, an anode end assembly 215, a cathode 216, a cathode end assembly 218 with electrical feed-throughs 219 for the cathode 216, laser mirrors 220 and a liquid stabilizing system 221 which are coaxially disposed with a central axis. The gas 212 is a mixture of helium gas and neon gas. The laser mirrors 220 are in alignment about the central axis. The hermetically sealed gas laser tube 211 including the laser mirrors 220, the capillary tube 213, the anode 214, the anode end assembly 215, the cathode 216, the cathode end assembly 218 and the electrical feed-throughs 219 are made of traditional construction materials. The liquid stabilizing system 221 includes a cylindrical plastic jacket 222 surrounding the hermetically sealed gas laser tube 211, a cooling liquid inlet 223, a cooling liquid 224 and a cooling liquid outlet 225. The plastic jacket 222 is sealed to the hermetically sealed laser tube 211 by O-rings 226 which are held in place by plastic retainers 227. The annulus between the hermetically sealed laser tube 211 and the plastic jacket 222 is filled with the cooling liquid 224. The cooling liquid 224 may be either ethylene glycol or water with a thermal conductivity greater than $1.0 \times 10^{-3}$ watts/centimeter/° C. and/or a specific heat capacity greater than 0.50 joule/gram/° C. The plastic jacket 222 puts the cooling liquid 224 in intimate contact with all or a large portion of the surface of the liquid stabilized internal mirror/internal resonator gas discharge laser tube 211. The thermal conductivity and the specific heat capacity of the cooling liquid 224 is sufficient to prevent misalignment of the mirrors 220 under conditions of liquid convection cooling. The cooling liquid 224 enters the liquid stabilizing system 221 through the cooling liquid inlet 223 and cools by liquid convection cooling a substantial portion of the hermetically sealed gas laser tube 211 with minimal asymmetry relative to the central axis.

Among the advantages of the present invention is that when the liquid stabilizing system is used with an internal mirror/internal resonator laser tubes substantial reductions of random lateral and longitudinal temperature gradients allow creation of longer, higher power argon, krypton, mixed gas argon/krypton, helium-cadmium and helium-neon lasers. The liquid stabilizing system includes the use of a bath of high conductivity, high specific heat liquid which is in contact with the external surface of the laser tube envelope and forms an integral part of the laser tube thermal structure. In specific embodiments argon, krypton, mixed gas, argonkrypton, helium-cadmium, and helium-neon lasers use a closed loop ethylene-glycol coolant bath to stabilize the resonator and dissipate waste heat at a remote location using a compact heat exchanger.

From the foregoing it can be seen that a liquid stabilizing system for use in an internal mirror/internal resonator gas discharge laser tube and has been described. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. A liquid-filled resonator stabilizing system for use with an internal mirror/internal resonator gas discharge laser tube assembly having a hermetically sealed gas laser tube including a gas, said gas including at least one gas of a group consisting of argon, krypton, neon, a capillary tube, an anode, an anode end assembly, a cathode, a cathode end bell and a cathode end assembly with electrical feed-throughs for the cathode, and having laser mirrors which are sealably mounted to each end of said hermetically sealed gas laser tube, said laser mirrors being maintained in alignment about the central axis by a resonator, said liquid-filled resonator stabilizing system comprising:
   a. a cylindrical plastic jacket which has a liquid inlet and a liquid outlet and which surrounds said hermetically sealed gas laser tube, said plastic jacket being sealed to said hermetically sealed laser tube by O-rings which are held in place by plastic retainers whereby an annulus if formed between said hermetically sealed laser tube and said plastic jacket; and
   b. a liquid which has a thermal conductivity greater than $1.0 \times 10^{-3}$ watts/centimeter/° C. and/or a specific heat capacity greater than 0.50 joule/gram/° C. and which fills said annulus so that said liquid is in intimate contact with all or a larger portion of the surface of said hermetically sealed gas laser tube, the thermal conductivity and the specific heat capacity of said liquid being sufficient to prevent misalignment of said laser mirrors;
wherein said hermetically sealed gas laser tube comprises a portion of said resonator structure and said liquid cools said hermetically sealed laser tube.

2. A resonator stabilizing system for use with an internal mirror/internal resonator gas discharge laser tube according to claim 1 wherein said liquid includes ethylene glycol.

3. A resonator stabilizing system for use with an internal mirror/internal resonator gas discharge laser tube according to claim 1 wherein said liquid includes water.

4. A resonator stabilizing system for use with an internal mirror/internal resonator gas discharge laser tube according to claim 1 wherein said liquid directed around the surface of said hermetically sealed gas laser tube in an axis-symmetric helical fashion.

5. A liquid-filled resonator stabilizing system for use with an internal mirror/internal resonator helium-cadmium discharge laser tube having a hermetically sealed gas laser tube including a mixture of helium and cadmium, a capillary tube, an anode, an anode end assembly, a cathode and a cathode end assembly with electrical feed-throughs for the cathode, and having laser mirrors which are sealably mounted to each end of said hermetically sealed gas laser tube, said laser mirrors being maintained in alignment about the central axis by a resonator, said liquid-filled resonator stabilizing system comprising:
   a. a cylindrical plastic jacket which has a liquid inlet and a liquid outlet and which surrounds said hermetically sealed gas laser tube, said plastic jacket being sealed to said hermetically sealed laser tube by O-rings which are held in place by plastic retainers whereby an annulus is formed between said hermetically sealed laser tube and said plastic jacket; and
   b. a liquid which has a thermal conductivity greater than $1.0 \times 10^{-3}$ watts/centimeter/° C. and/or a specific heat capacity greater than 0.50 joule/gram/° C. and which fills said annulus so that said liquid is in intimate contact with all or a large portion of the surface of said hermetically sealed gas laser tube, the thermal conductivity and the specific heat capacity of said liquid being sufficient to prevent misalignment of said laser mirrors;
wherein said hermetically sealed gas laser tube comprises a portion of said resonator structure and said liquid cools said hermetically sealed laser tube.

6. A resonator stabilizing system for use with an internal mirror/internal resonator helium-cadmium discharge laser tube according to claim 5 wherein said liquid includes ethylene glycol.

7. A resonator stabilizing system for use with an internal mirror/internal resonator helium-cadmium discharge laser tube according to claim 5 wherein said liquid includes water.

8. A resonator stabilizing system for use with an internal mirror/internal resonator helium-cadmium discharge laser tube according to claim 5 wherein said liquid is directed around the surface of said hermetically sealed gas laser tube in an axis-symmetric helical fashion.

9. A liquid-filled resonator stabilizing system for use with an internal mirror/internal resonator helium-neon discharge laser tube having a hermetically sealed gas laser tube 2 including a mixture of helium with neon, a capillary tube, an anode, an anode end assembly, a cathode and a cathode end assembly with electrical feed-throughs for the cathode, and having laser mirrors which are sealably mounted to each end of said hermetically sealed gas laser tube, said laser mirrors being maintained in alignment about the central axis by a resonator, said liquid-filled resonator stabilizing system comprising:
   a. a cylindrical plastic jacket which has a liquid inlet and a liquid outlet and which surrounds said hermetically sealed gas laser tube, said plastic jacket being sealed to said hermetically sealed laser tube by O-rings which are held in place by plastic retainers whereby an annulus is formed between said hermetically sealed laser tube and said plastic jacket; and
   b. a liquid which has a thermal conductivity greater than $1.0 \times 10^{-3}$ watts/centimeter/° C. and/or a specific heat capacity greater than 0.50 joule/gram/° C. and which fills said annulus so that said liquid is in intimate contact with all or a large portion of the surface of said hermetically sealed gas laser tube, the thermal conductivity and the specific heat capacity of said liquid being sufficient to prevent misalignment of said laser mirrors;

wherein said hermetically sealed gas laser tube comprises a portion of said resonator structure and said liquid cools said hermetically sealed laser tube.

10. A resonator stabilizing system for use with an internal mirror/internal resonator helium-neon discharge laser tube according to claim 9 wherein said liquid includes ethylene glycol.

11. A resonator stabilizing system for use with an internal mirror/internal resonator helium-neon discharge laser tube according to claim 9 wherein said liquid includes water.

12. A resonator stabilizing system for use with an internal mirror/internal resonator helium-neon discharge laser tube according to claim 9 wherein said liquid is directed around the surface of said hermetically sealed gas laser tube in an axis-symmetric helical fashion.

13. A gas laser system comprising:
a laser tube wall surrounding a cavity, wherein said cavity contains a gaseous laser medium;
a first laser mirror sealably mounted to said laser tube wall, said first laser mirror aligned with respect to said laser tube wall;
a second laser mirror sealably mounted to said laser tube wall, said second laser mirror aligned with respect to said laser tube wall;
wherein said laser tube wall maintains the optical alignment between said first laser mirror and said second laser mirror; and
a jacket for holding liquid in thermal contact with said laser tube wall, said liquid producing a substantially axially symmetric temperature distribution around said laser tube wall during operation of said gas laser system.

14. A gas laser system according to claim 13 wherein said laser mirrors are rigidly mounted to said laser tube wall.

15. A gas laser system according to claim 13 wherein both of said laser mirrors are rigidly mounted and hermetically sealed to said laser tube wall.

16. A gas laser system according to claim 13 wherein said jacket for holding liquid has an inlet and an outlet so that liquid can be circulated into and out of said jacket for holding liquid.

17. A gas laser system according to claim 16 wherein said gas laser system further comprises a closed loop liquid circulation system; and a heat exchanger remotely situated from said laser tube wall, said closed loop circulation system for thermally coupling said heat exchanger to said laser tube wall.

18. A gas laser system according to claim 13 wherein said liquid comprises water.

19. A hermetically sealed laser tube assembly for use in a gas laser system, said laser tube assembly comprising:
a laser tube, said laser tube defining a laser gain region, said laser gain region amplifying light passed through said laser gain region;
a first laser mirror sealably mounted to an end of said laser tube, said first laser mirror being rigidly mounted in relation to said laser tube, and said laser mirror having a reflective surface facing on said laser gain region;
a second laser mirror, said first laser mirror and said second laser mirror together acting as a resonator in said gas laser system;
a liquid in contact with said laser tube, said liquid regulating the operating temperature of said laser tube sufficiently to maintain the optical stability of said resonator.

20. The laser tube assembly of claim 19 wherein said second laser mirror is sealably mounted to the laser tube.

21. The laser tube assembly of claim 20 wherein said first laser mirror and said second laser mirror are rigidly mounted and hermetically sealed to said laser tube.

22. The laser tube assembly of claim 19 further comprising a plastic jacket surrounding a portion of said laser tube;
wherein said liquid circulates through said plastic jacket adjacent to said laser gain cavity of the gas laser system.

23. The laser tube assembly of claim 19 further comprising a heat exchanger, said heater exchanger being physically separate from said laser tube; and
a closed loop circulation system, wherein said liquid circulates from said laser tube through said closed loop liquid circulation system to said heat exchanger.

24. The laser tube assembly of claim 19 wherein said liquid has a sufficiently high thermal conductivity to maintain the optical stability of said resonator.

25. The laser tube assembly of claim 19 wherein said liquid has a sufficiently high specific heat to maintain the optical stability of said resonator.

* * * * *